INVENTORS
Ralph E. Marbury and
William H. Cuttino.
BY O. B. Buchanan
ATTORNEY

Patented Jan. 17, 1939

2,144,503

UNITED STATES PATENT OFFICE

2,144,503
SERIES CAPACITOR PROTECTION

Ralph E. Marbury, Wilkinsburg, and William H. Cuttino, Pittsburgh, Pa., assignors to Westinghouse Electric & Manufacturing Company, East Pittsburgh, Pa., a corporation of Pennsylvania Application March 9, 1936, Serial No. 67,820

14 Claims. (Cl. 175—294)

Our invention relates to protective means for series-capacitor aggregates such as are used on alternating-current transmission or distribution lines, either for the purpose of improving the voltage-regulation, as in the case of a distribution line, or for the purpose of increasing the stability of synchronous machines, as in the case of transmission lines.

The particular object of our invention is to provide such a protective means which is self-restoring, in the event of a temporary overcurrent condition on the series circuit or line, which would cause an overvoltage to appear across the series-capacitor aggregate.

It was well known that the cost of a series capacitor varies approximately with the square of the voltage, for any given number of microfarads, and that the voltage on the series capacitor is equal to the product of the capacitive impedance and the current, except in the event of transients, where the voltage may be greater.

In the particular type of series-capacitor aggregate to which our invention applies, the voltage-rating of the capacitor is determined by the maximum load-current on the line or by a current which is very slightly greater than this normal maximum current, for example, 115% thereof. We have found, from experience, that a momentary increase to 200% voltage may be tolerated on the series capacitor, while the protective equipment is getting into operation, but this overvoltage condition should not be exceeded even momentarily, and it is an object of our invention to provide a safe and reliable means for thus limiting the momentary overvoltage which appears on the series capacitor at times of a fault or short-circuit on the series circuit or line on which the series capacitor is being utilized.

A distinctive feature of our invention is the shunting of the series capacitor with a protective bypass gap-device which is of extremely rugged and durable construction, with adequate provision for heat-storage and for heat-dissipation, so that, even in the event of a failure of the protective relays and contactors which are utilized to supplement the action of the bypass gap-device, the gap-device could, nevertheless, safely carry the full line current, even in the event of a fault on the line, for a time which is sufficient for the fault-clearing protective equipment of the line to clear the fault thereon, as by opening a line circuit breaker.

A further object of our invention relates to the utilization of a plurality of series-capacitor aggregates at a single point in the line, with a lateral feeder tapped off of the line at a point between two serially connected capacitor aggregates.

Other objects of our invention relate to various details and combinations of protective equipment.

In the accompanying drawings.

Figure 1:
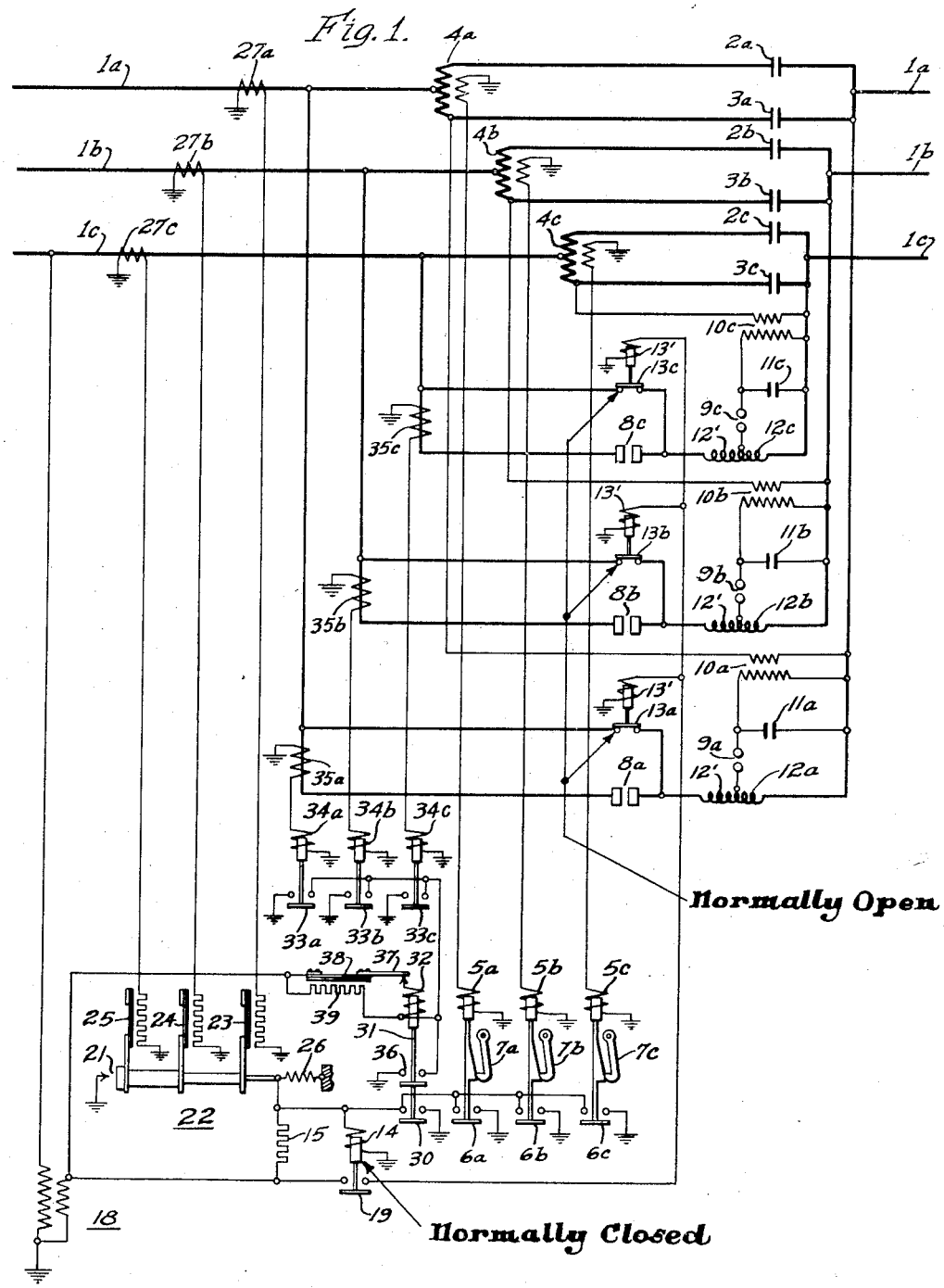
Figure 1 is a diagrammatic view of circuits and apparatus embodying our invention in a preferred form.

In Fig. 1, our invention is shown as applied to a three-phase transmission or distribution line or circuit $1a$, $1b$, $1c$, the several phases of which are connected to three two-part series-capacitor aggregates $2a$, $3a$; $2b$, $3b$; and $2c$, $3c$. Each capacitor aggregate is divided into two substantially equal, parallel-connected parts 2 and 3, the respective parallel parts being joined by three differential current-transformers $4a$, $4b$, $4c$, respectively, the midpoints of which are connected to the lines $1a$, $1b$, $1c$, so that when there is no internal fault in the capacitor aggregates, the current will equally divide in the differential current transformers, so that there will be no substantial current-flow in the secondary windings of said differential current transformers. The three differential current transformers are utilized to energize three mechanically latched differential relays $5a$, $5b$ and $5c$ in the event of an internal fault in the capacitor aggregates, said relays having normally open contacts $6a$, $6b$ and and $6c$, and latches $7a$, $7b$ and $7c$ for holding the relays "in" or closed, once they are actuated.

The three capacitor aggregates are shunted by three main or bypass gap-devices $8a$, $8b$ and $8c$ which are constructed of electrode-material having a very low ionizing voltage. Such material is preferably so-called "carbon", which is a specially baked and compressed mixture of lampblack, coke or graphite with some sort of binding material, usually coal-tar or pitch. However, other materials may be utilized, such as graphite, which is slightly better in respect to its ready ionization, but which is crumbly, and tungsten, which is satisfactory in its operation, but rather costly. The object in utilizing a readily ionizable material for the electrodes of the bypass-gap is to produce an arcing device having a low recovery voltage, that is, a device in which the arc reforms promptly after each current-zero (at which the arc goes out). By reforming promptly, that is, at a low point on the rising voltage-wave, the arc prevents the formation of high peaks of voltage at the beginning of each half-cycle, before the reformation of the arc, such high-voltage peaks being objectionable in forming oscillation harmonics of high amplitude.

The bypass gap-devices 8a, 8b, 8c are very ruggedly constructed, so as to have ample current-carrying capacity to enable them to carry the maximum possible current that can exist on the line, that is, to carry the worst fault-current, due to a fault on the line. Preferably also, as will be subsequently pointed out, the bypass gap-devices can carry these heavy currents for appreciably more than just a moment of time, without material damage.

An objection to any high-current arc-device, and to the utilization of carbon as an arcing material, is that the electrodes are subject to burning, thereby altering the calibration or breakdown-voltage of the arc. We preferably design the main bypass gap-devices 8a, 8b and 8c, therefore, so that they will have an insensitive breakdown characteristic which is higher, in general, than the maximum permissible voltage which can be permitted to appear, for any material length of time, across the terminals of the series capacitors, and we utilize an auxiliary break-down-initiating means for causing the initial breakdown of the main gap-device in the event of an overvoltage on the series capacitor. To this end we may utilize the breakdown-initiating means which is shown and described in Patent No. 2,072,717, of Ralph E. Marbury, granted March 2, 1937, for Protective device for capacitors.

As shown in Fig. 1, the breakdown-initiating means for the three bypass gap-devices 8a, 8b and 8c consist of three pilot-gap devices 9a, 9b and 9c which are energized from three stepup transformers 10a, 10b and 10c which are connected across the capacitors 3a, 3b and 3c, respectively, the secondary windings of the stepup transformers being shunted by three small capacitors 11a, 11b and 11c, which are, in turn, shunted by the respective pilot-gap devices 9a, 9b and 9c, each in series with one of three small inductance devices or open-air coils 12a, 12b and 12c, respectively, said coils being also connected in the bypass circuit including the bypass gap-devices 8a, 8b and 8c, bypassing the several series-capacitor aggregates.

Tuned oscillation circuits are provided by the several pairs of small capacitors and coils 11a, 12a; 11b, 12b; 11c, 12c; said oscillation circuits being set into oscillation by the discharge of the respective pilot-gap devices 9a, 9b and 9c, thereby building up high-voltage oscillations, at high frequency, in the respective inductance coils 12a, 12b and 12c. These high-voltage oscillations are thereupon applied to the respective main bypass gaps 8a, 8b and 8c through circuits including the respective series-capacitor aggregates 2a, 3a; 2b, 3b; and 2c, 3c; the series-capacitor aggregates having an extremely low impedance to the flow of the high-frequency currents, thus causing the high-frequency voltage to appear across the main gap-devices, causing breakdown thereof. The respective inductance coils 12a, 12b and 12c may advantageously be provided with additional turns constituting auto-transformer extensions 12', as shown, for the purpose of increasing the voltage of the high-frequency oscillations which are applied to the respective main gap-devices 8a, 8b and 8c.

The pilot gaps 9a, 9b and 9c are so utilized that they are not called upon to carry very large currents, and are not designed to carry large currents. They are carefully calibrated so as to have a constant breakdown voltage of a predetermined value which does not change as a result of repeated operations of the gap-devices. The electrode-material is preferably brass or other non-arcing material which, because of its high ionizing potential, does not so readily maintain an arc, thus minimizing the burning of the electrodes. The pilot-gap electrodes are set a sufficient distance apart so that a very slight burning of the electrodes will not materially affect the breakdown voltage, and to this end it is usually desirable to have the pilot gap break down at a voltage of the order of 4000 volts, or even 8000 volts, whereas a much lower voltage, possibly of the order of 500 volts, is the normal voltage rating of the series-capacitor aggregate. It is difficult to maintain an accurately calibrated gap which will break down at 500 volts, particularly if the gap is also called upon to carry heavy currents, but it is easy to provide a pilot gap which breaks down at thousands of volts and which carries only a small current.

The voltage-ratios of the stepup transformers 10a, 10b, 10c, and the settings of the pilot gaps 9a, 9b, 9c are preferably so adjusted that the pilot gaps will break down upon the occurrence of about twice the normal rated voltage on the capacitors. In many instances it is not desirable to set the pilot gaps to break down at a lower overvoltage on the series capacitors, such as a 115% voltage, because there are various transients on the line, such as motor-starting transients, and transients resulting from other sudden current-increments in the line 1a, 1b, 1c, depending upon the particular point in the voltage-wave at which the sudden current-increment occurs, and these transient voltages in the series capacitors may be quite large, even though the actual current-increments are relatively small. It has been found that the series-capacitor aggregates can readily withstand the double voltage for the very small fraction of a cycle of the line frequency which elapses before the breakdown of the pilot gaps 9a, 9b, 9c and hence the breakdown of the main gaps 8a, 8b, 8c.

The three bypass gap-devices 8a, 8b and 8c are protected by means of three bypass circuit-make-and-break devices or contactors having contact-members 13a, 13b and 13c which are closed (as by gravity) when the contactors are deenergized, said contactors having operating-coils 13', which are all energized or deenergized, together, under the control of a contactor-controlling relay 14, the operating coil or mechanism of which is energized, through a resistor 15, from a source of relaying voltage, such as the secondary winding of a potential transformer 18, which is energized from the voltage appearing on one of the phases of the line 1a, 1b, 1c. The contactor-controlling relay 14 has a contact 19 which is opened (as by gravity) when the relay is deenergized, said contact being utilized, in its closed position, to energize the three operating coils 13' of the bypass contactors from the potential transformer 18.

It will be noted that the contactor-controlling relay 14 is normally energized from the potential transformer 18, so that the relay-contact 19 is thus held in its closed position, thereby energizing the three bypass contactors 13' and holding their contact-members 13a, 13b and 13c open, so that the respective bypass gap-devices 8a, 8b and 8c are not short-circuited by bypass contactors in the normal operation of the series-capacitor installation. This provision is made so as not to require the presence of a relaying voltage in order to move the contactors from their normal operating condition, with their operating-coils 13' energized and their contacts 13a, 13b and 13c open, so that failure of the source of relaying voltage will always result in a safe condition of the apparatus. If a relaying voltage were necessary in order to cause the contactor-contacts 13a, 13b, 13c to close, an occasion might arise in which it was necessary to close said contacts and there would not be an adequate relaying voltage for bringing about that result, as in the event of a severe short-circuit on the particular phase to which the potential transformer 18 is connected.

We operate our contactor-controlling relay 14 by deenergizing the same in response to various conditions which will now be described. The deenergizing means takes the form of various relay-contacts for short-circuiting the operating coil of the contactor-controlling relay 14 in response to the various conditions which are utilized for causing an opening of the relay-contacts 19 and hence a closure of the bypass contactor-contacts 13a, 13b and 13c, which short-circuit the various main arc-devices 8a, 8b and 8c and the various series-capacitor aggregates 2a, 3a; 2b, 3b; and 2c, 3c.

One means for short-circuiting the operating coil of the contactor-controlling relay 14 is a normally open contact 21 of a thermal or other time-delay overcurrent relay 22 having three bimetallic elements 23, 24 and 25, the movement of any one of which can close the contact 21 against the action of a spring 26. The three bimetallic elements 23, 24 and 25 are separately heated by means of currents derived from three line current-transformers 27a, 27b and 27c connected in the several line-wires 1a, 1b, 1c. The thermal relay 22 preferably has a suitable time-delay for permitting the starting of large motors on a distribution line, without causing an unnecessary closure or deenergization of the normally energized bypass contactors 13. This time-delay may have a maximum value of three minutes at 115% load on the distribution line, and possibly ten seconds at 200% load, or other time-delay values which are considered to be desirable. Thus, if an overcurrent occurs on the line, the overcurrent relay 22 is not operated if the overcurrent is of a sufficiently small duration, but if the overcurrent persists, the series-capacitor aggregates are protected by the closure of the overcurrent contact 21 which deenergizes the relay 14 and the contactors 13, thus closing the contactor-contacts 13a, 13b, 13c, short-circuiting all of the series-capacitor aggregates in three phases of the distribution line.

A second means for short-circuiting the operating coil of the contactor-controlling relay 14, and thus deenergizing the contactors and causing a closure of their contacts 13a, 13b and 13c, by-passing or short-circuiting the series-capacitor aggregates, utilizes the normally open contacts 6a, 6b and 6c of the differential relays 5a, 5b and 5c, which are energized whenever the equal current-distribution in the two halves of each capacitor-aggregate is disturbed, which can only mean that there is an internal fault somewhere in the aggregate. When this happens, the differential relays 5a, 5b, 5c are closed and latched in their closed position so that they remain closed until manually reset. Thus, the contactor-controlling relay 14 is deenergized and the contactor coils 13' are deenergized, thus causing closure of the contactor-contacts 13a, 13b and 13c.

A third means for short-circuiting the operating coil of the contactor-controlling relay 14 is a normally open contact 30 of a breakdown-responsive relay 31, having an operating coil 32 which is energized from the potential-source 18 by the closure of any one of the normally open contacts 33a, 33b and 33c of three auxiliary breakdown-responsive relays 34a, 34b, 34c, the operating coils of which are energized from three current-transformers 35a, 35b, 35c connected in circuit with the three gaps 8a, 8b and 8c. Thus, whenever any one of the main three gaps 8a, 8b or 8c breaks down, the resultant current-flow in the gap causes the energization of its corresponding auxiliary relay 34a, 34b or 34c, thus energizing the breakdown-responsive relay 31 and closing its contact 30 which short-circuits the operating coil of the contactor-controlling relay 14 and deenergizes the contactor-coils 13', permitting all of the contactor-contacts 13a, 13b and 13c to close by gravity or what other biasing means is provided therefor.

As soon as the contactor-contacts 13a, 13b and 13c are closed, the arc is extinguished in the bypass gap-device, and, in the system shown in Fig. 1, the current is also extinguished in the three current-transformers 35a, 35b and 35c, thus deenergizing the auxiliary breakdown-responsive relays 34a, 34b and 34c. If there were no provision against it, the result of this operation would be to immediately reenergize the contactors 13', thus reopening their contacts 13a, 13b and 13c, possibly while said contacts were carrying a heavy fault-current which might be flowing at the time, in the distribution or transmission line 1a, 1b, 1c, assuming that the overcurrent was a result of a fault and that the fault had not yet been cleared. Of course, the opening of the contactor-contacts 13a, 13b and 13c would cause the affected bypass gap 8a, 8b, or 8c to immediately break down again and carry an arc, thus causing an immediate reclosure of the contactor-contacts 13a, 13b and 13c. This "pumping" action of the contactors is avoided, in the embodiment of our invention shown in Fig. 1, by equipping the breakdown-responsive relay 31 with a holding-in contact 36 which is utilized to maintain the energization of the operating coil 32 of said relay whenever said relay closes, so that it thereafter remains energized, even after the opening of the auxiliary-relay contacts 33a, 33b or 33c which initially energized the relay 31.

The holding-circuit for maintaining the energization of the operating coil 32 of the breakdown-responsive relay 31 is broken, after a suitable time-delay, by means of a normally closed contact 37 of a thermal or other time-delay relay 38, having a heater element 39 which is connected in parallel across the coil 32 which has the contact 37 in series with it. The thermal relay 38 is set to open its contact 37 in any desired predetermined time, such as three seconds, or other time suitable for the complete operation of whatever fault-responsive protective devices (not shown) are utilized on the particular transmission or distribution line 1a, 1b, 1c in which the series-capacitor aggregates are connected.

With the apparatus as just described, a predetermined overvoltage on any one of the series-capacitor aggregates will cause a breakdown of the corresponding pilot-gap 9a, 9b or 9c. Ordinarily, this breakdown-voltage is set sufficiently high so that it will not occur too often as a result of frequently occurring transients, such as motor-starting transients, as previously described. Whenever any one of the main gap-devices 8a, 8b, 8c breaks down, the resulting current-flow therein energizes the corresponding auxiliary relay 34a, 34b or 34c, and hence energizes the breakdown-responsive relay 31 which thereupon locks itself in, and maintains its energization for a predetermined time which is controlled by the thermal relay 38 which, at the expiration of said time, opens its contact 37 and deenergizes the breakdown-responsive relay 31. While the breakdown-responsive relay 31 is energized, the operating coil of the contactor-controlling relay 14 is short-circuited and all of the contactors 13 are, therefore, deenergized so that their contacts 13a, 13b and 13c are closed, thereby by-passing both the series-capacitor aggregate and the main gap-device, in each phase of the series-circuit or line 1a, 1b or 1c.

It will be noted that, while the time-delay in the re-opening of the contactor-contacts after a breakdown of one of the bypass gaps is sufficient, in general, for the clearing of a fault on the distribution line, it is less than the maximum time of relay of the overcurrent relay 22 on slight overloads. Therefore, the series capacitors may be restored to service, after a breakdown of the bypass gap-devices, before the delayed-action overcurrent relay has become actuated.

As previously indicated, we preferably utilize main gap-devices 8a, 8b and 8c which are of special construction in order to be able to carry heavy-current arcs for long periods of time, or at least for periods sufficiently long for a fault to be cleared from the transmission or distribution line in which the series capacitors are utilized.

Figure 2:
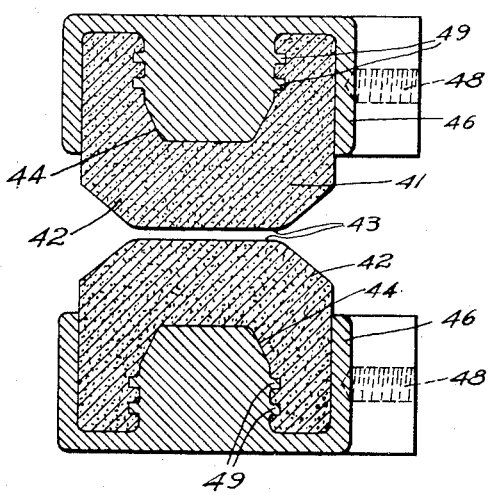
Fig. 2 is a cross-sectional view of the main bypass-gap structure.

A desirable construction of the main gap-device is shown in Fig. 2, from which it will be seen that the gap-device 8a, for instance, comprises two carbon electrodes 41 and 42 having large flat arcing surfaces 43 which constitute the terminals of the arcing gap. The back surfaces of the carbon electrodes 41 and 42 are hollowed out, as indicated at 44, and are filled with a metallic casting, as indicated at 46, the metallic casting not only filling the hollow 44, but also surrounding a good portion of the side surfaces of the electrodes 41 and 42, respectively. The metal of the casting 46 is of good heat-conducting quality, whereas carbon is a poor conductor of heat. The metal thus serves to carry heat away from the carbon, with a minimum distance of heat-flow in the carbon from the arc-surfaces 43, where the heat is generated, to the metal part 46 from which the heat may be readily conducted and dissipated or stored in the metal of the casting 46 or in the supporting member (not shown) to which the casting is attached as by means of threaded-means as indicated at 48. The hollow opening 44 in the electrodes 42 may preferably be provided with one or more grooves 49 forming an interlocking connection between the carbon and the metal, preferably at a point sufficiently far removed from the source of heat so that the temperature-differences at that point will not be too great.

Figure 3:
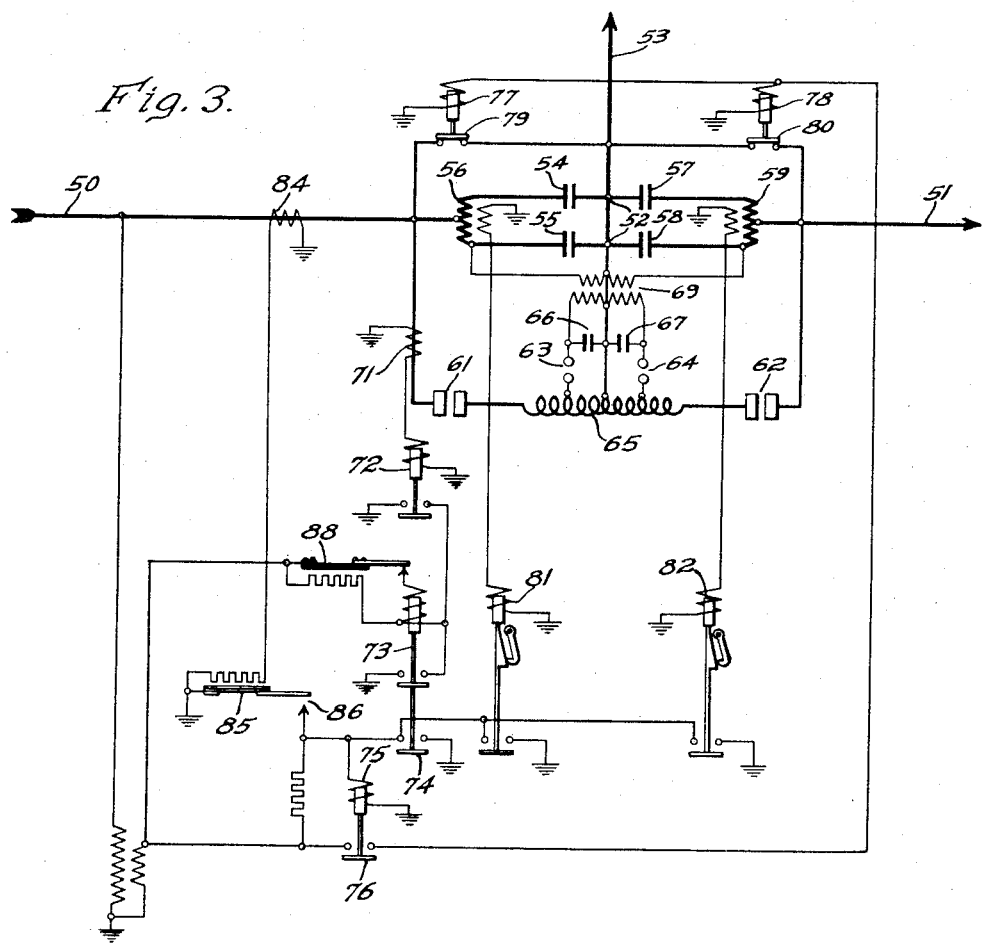
Fig. 3 is a view similar to Fig. 1 showing the application of the invention to a single phase of a line having a lateral feeder connected at a point between two serially connected capacitors.

In Fig. 3, our invention is shown as being applied to a distribution line of the type in which a lateral feeder is tapped off from the line, and it is desired to have a plurality of separate series-capacitor aggregates connected at different sides of the junction-point of the feeder. In such an installation, the several series-capacitor aggregates may be jointly controlled, thereby saving substantially in the cost of the protective equipment therefor.

In Fig. 3, only a single phase is indicated, although, in general, the invention will be applied to a three-phase line. The power is assumed to be coming in on the line 50 and leaving from a continuation of said line at 51, with power tapped off from an intermediate junction-point 52 to supply load-current to a lateral feeder 53. A two-part series-capacitor aggregate 54, 55 is connected between the junction-point 52 and a differential current-transformer 56, the midpoint of which is connected to the incoming line 50. A second series-capacitor aggregate 57, 58 is shown as being connected between the junction-point 52 and a differential current-transformer 59, the midpoint of which is connected to the outgoing line 51.

The protective features of the system shown in Fig. 3 are in many respects similar to those described for Fig. 1. There are two bypass gap-devices 61 and 62, the gap 61 being in shunt to the capacitor-aggregate 54, 55, and the gap 62 being in shunt to the capacitor-aggregate 57, 58. There are two pilot-gap devices 63 and 64, one for each of the main gap-devices 61 and 62. These pilot-gap devices are associated with tuned circuits, the inductance parts of which are tapped portions of a single open-air coil 65, and the capacitance parts of which are two small capacitors 66 and 67, respectively. The pilot-gaps 63 and 64 are energized from a mutual-impedance means such as the tapped secondary side of a single, multi-primary stepup transformer 69, the two primaries of which are shunted across the series capacitors 55 and 58, respectively. With this arrangement, an overvoltage on either one of the capacitors 55 and 58 will be reflected in an overvoltage on the secondary side of the stepup transformer 69, so that both pilot-gaps 63 and 64 will be broken down, causing the same to arc and to set up high-frequency oscillating currents in their respective tuned circuits, thus impressing high voltages at high frequency on the main gaps 61 and 62, causing the latter to break down.

Since both of the main gaps 61 and 62 are broken down simultaneously, a single breakdown-responsive means is all that is needed, the same being shown as comprising a current transformer 71 in series with the gap 61, an auxiliary breakdown-responsive relay 72, and a breakdown-responsive relay 73, the latter having a contact-member 74 which closes and short-circuits the operating coil of a contactor-controlling relay 75, when the main gap-device 61 breaks down. The contactor-controlling relay 75 has a contact 76 that deenergizes both contactors 77 and 78, said contactors having gravity-closed contacts 79 and 80, respectively, which are shunted across the two series-capacitor aggregates 54—55 and 57—58, respectively. It will thus be noted that, when the main gap-device 61 carries an arcing current, both of the contactors 77 and 78 are simultaneously deenergized so as to permit their gravity-closed contacts 79 and 80 to short-circuit both of the series-capacitor aggregates.

The other features of the protective equipment of Fig. 3 are quite similar to the protective equipment already described for Fig. 1, except that there are two differential relays 81 and 82, one for each of the series-capacitor aggregates, these relays being connected so that the energization of either one of them will short-circuit the contactor-controlling relay 75 and cause a closure of the contactor-contacts 79 and 80, thus short-circuiting both of the series-capacitor aggregates.

The overcurrent protection is afforded by a single line-current-transformer 84, placed in the incoming line 50, and energizing a thermal relay 85 having a contact 86 which short-circuits the operating coil of the contactor-controlling relay 75, as will be obvious from previous explanations.

As in Fig. 1, a timing relay 88 is associated with the breakdown-responsive relay 73, operating in the manner already described.

It will be noted that we have provided complete protection against all forms of trouble or failure in connection with the series-capacitor installations of both Fig. 1 and Fig. 3. Even in the event of a failure of the stepup transformer which energizes the pilot-gap circuit, the current-balance of the differential current-transformer will be disturbed, causing the differential relays to operate as for an internal fault in the series-capacitor aggregate. It is obvious, of course, that it is not necessary to utilize all of the protective features in every installation, as some of the features may be sacrificed in the interests of simplicity and economy, if so desired. It is also obvious that the particular type of breakdown-initiating means is subject to variation, and that the overcurrent and differential-current protective features may be utilized to provide any suitable bypass circuit around the series-capacitor aggregate, without being limited to the particular contactor arrangement which is illustrated for that pupose. We desire, therefore, that the appended claims shall be accorded the broadest construction consistent with their language and the prior art.

We claim as our invention:

1. Protective means for a series-capacitor aggregate, comprising the combination, with said series-capacitor aggregate, of a bypass circuit around said series-capacitor aggregate; said bypass circuit including a bypass gap-device capable of carrying the maximum possible current for a time greater than a time which is adequate for clearing a fault on the circuit of which the series-capacitor aggregate is a part, and a bypass contactor having contacts in shunt to said bypass gap-device, said bypass gap-device having a low arcing voltage but having a breakdown voltage which is higher than the maximum permissible voltage which the series-capacitor aggregate can safely withstand for any material length of time; series-circuit overcurrent means responsive to a current slightly higher than normal, in the circuit of which the series-capacitor aggregate is a part, for causing a substantial current-flow in a portion of said bypass circuit around said series-capacitor aggregate; said series-circuit overcurrent means being operative to subsequently interrupt said current-flow in said portion of said bypass circuit; means responsive to conditions corresponding to a still larger current, in the circuit of which the series-capacitor aggregate is a part, for causing arcing of said bypass gap-device before said maximum permissible voltage is substantially exceeded on the series-capacitor aggregate; and contact-controlling means responsive to the passage of a current in said bypass gap-device for normally causing said contactor contacts to close and to remain temporarily in closed position, even after a cessation of the arcing of said bypass gap-device; said contact-controlling means being operative a predetermined time after the closure of said contactor contacts for causing the same to reopen, the reopening time being greater than a time which is adequate for clearing a fault on the circuit of which the series-capacitor aggregate is a part.

2. Protective means for a series-capacitor aggregate, comprising the combination, with said series-capacitor aggregate, of a bypass circuit around said series-capacitor aggregate; said bypass circuit including a bypass gap-device capable of carrying the maximum possible current for a time greater than a time which is adequate for clearing a fault on the circuit of which the series-capacitor aggregate is a part, and a bypass contactor having contacts in shunt to said bypass gap-device, said bypass gap-device having a low arcing voltage but having a breakdown voltage which is higher than the maximum permissible voltage which the series-capacitor aggregate can safely withstand for any material length of time; series-circuit overcurrent means responsive to a current slightly higher than normal, in the circuit of which the series-capacitor aggregate is a part, for causing said contactor contacts to close; means responsive to conditions corresponding to a still larger current, in the circuit of which the series-capacitor aggregate is a part, for causing arcing of said bypass gap-device before said maximum permissible voltage is substantially exceeded on the series-capacitor aggregate; and contact controlling means responsive to the passage of a current in said bypass gap-device for normally causing said contactor contacts to close and to remain temporarily in closed position, even after a cessation of the arcing of said bypass gap-device; said contact-controlling means being operative a predetermined time after the closure of said contactor contacts for causing the same to reopen, the reopening time being greater than a time which is adequate for clearing a fault on the circuit of which the series-capacitor aggregate is a part.

3. A series-capacitor equipment for an alternating-current line, comprising the combination, with the series capacitor, of a main gap-device shunting said series capacitor, said main gap-device being of heavy current-capacity and having an insensitive break-down-voltage characteristic which, at least at times, is higher than the voltage which can be permitted to appear on the series capacitor, an auxiliary gap-device, said auxiliary gap-device being of low current-capacity and having a sensitive breakdown-voltage characteristic, means for energizing said auxiliary gap-device in response to the voltage across the series capacitor whereby said auxiliary gap-device breaks down when the series-capacitor voltage rises to a value which is above normal but permissible, an auxiliary oscillatory circuit associated with said auxiliary gap-device, said auxiliary oscillatory circuit comprising a small inductance and a small capacitance connected in oscillatory circuit relation, means for so coupling said auxiliary oscillatory circuit to said main gap-device as to cause the latter to beak down whenever the auxiliary gap-device breaks down, a bypass contactor having contacts in shunt to said main gap-device, and contact-controlling means responsive to the passage of a current in said main gap-device for causing said contactor contacts to close and to remain temporarily in closed position, even after a cessation of the arcing of said main gap-device, said contact-controlling means being operative a predetermined time after the closure of said contactor contacts for causing the same to reopen.

4. A series-capacitor equipment for an alternating-current line, comprising the combination, with the series capacitor, of a main gap-device and a small serially connected inductance device in a shunt circuit around said series capacitor, said main gap-device being of heavy current-capacity and having an insensitive breakdown-voltage characteristic which, at least at times, is higher than the voltage which can be permitted to appear on the series capacitor, an auxiliary gap-device, said auxiliary gap-device being of low current-capacity and having a sensitive breakdown-voltage characteristic, stepup-transformer means for energizing said auxiliary gap-device in response to the voltage across the series capacitor whereby said auxiliary gap-device breaks down when the series-capacitor voltage rises to a value which is above normal but permissible, an auxiliary oscillatory circuit associated with said auxiliary gap-device, said auxiliary oscillatory circuit comprising a small inductance and a small capacitance connected in oscillatory circuit relation, means including at least some of said small serially connected inductance device and at least some of the small inductance of said auxiliary oscillatory circuit for so coupling said auxiliary oscillatory circuit to said main gap-device as to cause the latter to break down whenever the auxiliary gap-device breaks down, a bypass contactor having contacts in shunt to said main gap-device, and contact-controlling means responsive to the passage of a current in said main gap-device for causing said contactor contacts to close and to remain temporarily in closed position, even after a cessation of the arcing of said main gap-device, said contact-controlling means being operative a predetermined time after the closure of said contactor contacts for causing the same to reopen.

5. A series-capacitor equipment for an alternating-current line, comprising, in combination, a series-capacitor aggregate, gap-device protective means therefor including a bypass gap-device which normally carries no substantial current but which breaks down and carries a substantial current in response to abnormal conditions in said series-capacitor aggregate and before said series-capacitor aggregate is impressed with a dangerously high curent, whereby current is bypassed around said series-capacitor aggregate and excessive voltages are prevented therein, a bypass contact-make-and-break device shunted around said series-capacitor aggregate and around said gap-device protective means, said bypass contact-make-and-break device having means for normally biasing its contacts toward closed position and means for opening said contacts and for normally holding the same open in the normal use of the series-capacitor equipment, and contact-controlling means responsive to a substantial current-flow in the bypass gap-device for discontinuing the holding of the contacts in their open position, whereby said contacts close under the action of their biasing means, the construction and arrangement of the apparatus being such that said contacts thereupon remain temporarily closed, even after the cessation of a substantial current-flow in said bypass gap-device, said contact-controlling means being operative only after a time-delay after the closure of said contact-make-and-break device for restoring the same to its normal open position, said time-delay being longer than the time required, in general, for clearing a fault on the alternating-current line.

6. A series-capacitor equipment for an alternating-current line, comprising, in combination, a series-capacitor aggregate, gap-device protective means therefor including a bypass gap-device which normally carries no substantial current but which breaks down and carries a substantial current in response to abnormal conditions in said series-capacitor aggregate and before said series-capacitor aggregate is impressed with a dangerously high current, whereby current is bypassed around said series-capacitor aggregate and excessive voltages are prevented therein, a bypass contact-make-and-break device shunted around said series-capacitor aggregate and around said gap-device protective means, said bypass contact-make-and-break device having means for normally biasing its contacts toward closed position and means for opening said contacts and for normally holding the same open in the normal use of the series-capacitor equipment, and contact-controlling means responsive to a substantial current-flow in the bypass gap-device for discontinuing the holding of the contacts in their open position, whereby said contacts close under the action of their biasing means, the construction and arrangement of the apparatus being such that said contacts thereupon remain temporarily closed, even after the cessation of substantial current-flow in said bypass gap-device, said contact-controlling means being operative to restore said contact-make-and-break device to its normal open position at some later time, the bypass gap-device being of such nature and capacity that it is capable of withstanding the fault-current of the alternating-current line for a time sufficient for the clearing of the fault from the line, in the event of a failure of the closure of the bypass contact-make-and-break device.

7. Self-restoring protective means for a series-capacitor aggregate comprising the combination, with said series-capacitor aggregate, of a bypass gap-device shunting said series-capacitor aggregate, a bypass contact-make-and-break device also shunting said series-capacitor aggregate, series-circuit time-delay overcurrent means, responsive to a higher-than-normal current in the circuit of which said series-capacitor aggregate is a part, for effecting a temporary closure of said bypass contact-make-and-break device after a time-delay and for subsequently effecting an opening of said bypass contact-make-and-break device after a return to normal current conditions in said circuit, capacitor-failure-responsive means, responsive to an internal failure in said series-capacitor aggregate, for effecting a permanent closure of said bypass contact-make-and-break device, breakdown-initiating means comprising a pilot-gap device responsive to a predetermined overvoltage condition of said series-capacitor aggregate for substantially instantaneously causing breakdown of said bypass gap-device, said predetermined overvoltage condition being greater than the voltage condition generally prevailing for the minimum overcurrent response, and means responsive to a breakdown of said bypass gap-device for effecting a temporary closure of said bypass contact-make-and-break device and for subsequently, but only after a time delay, effecting an opening of said contact-make-and-break device, provided that neither said series-circuit overcurrent means nor said capacitor-failure-responsive means is then actuated.

8. Protective means for a series-capacitor aggregate, comprising, in combination with said series-capacitor aggregate, a bypass gap-device connected in shunt to said series-capacitor aggregate, contact-make-and-break means connected in shunt to both said gap-device and said series-capacitor aggregate, a delayed-action overcurrent relay responsive to the current in the series circuit of which the series-capacitor aggregate is a part for effecting a closure of said contact means upon continuance of an overload condition for a predetermined time and for effecting a reopening of said contact means after the discontinuance of the closure-causing overcurrent condition, and means responsive to a breakdown of the bypass gap-device for effecting a closure of said contact means and for insuring that said contact means remains closed for a predetermined time regardless of the condition of the circuit, and for subsequently effecting a reopening of said contact means, said last-mentioned predetermined time being sufficient, in general, for the clearing of a fault on the series circuit of which the series-capacitor aggregate is a part, but being less than the maximum time of delay of the overcurrent relay on slight overloads.

9. Protective means for a series-capacitor aggregate, comprising the combination, with said series-capacitor aggregate, of a bypass circuit around said series-capacitor aggregate; said bypass circuit including a bypass gap-device capable of carrying the maximum possible current for a time greater than a time which is adequate for clearing a fault on the circuit of which the series-capacitor aggregate is a part, and a bypass contactor having contacts in shunt to said bypass gap-device, said bypass gap-device having a low arcing voltage but having a breakdown voltage which is higher than the maximum permissible voltage which the series-capacitor aggregate can safely withstand for any material length of time; series-circuit overcurrent means responsive to a current slightly higher than normal, in the circuit of which the series-capacitor aggregate is a part, for causing a substantial current-flow in a portion of said bypass circuit around said series-capacitor aggregate; said series-circuit overcurrent means being operative to subsequently interrupt said current-flow in said portion of said bypass circuit; means responsive to conditions corresponding to a still larger current, in the circuit of which the series-capacitor aggregate is a part, for causing arcing of said bypass gap-device before said maximum permissible voltage is substantially exceeded on the series-capacitor aggregate; and contact-controlling means responsive to the passage of a current in said bypass gap-device for normally causing said contactor contacts to close and to remain temporarily in closed position, even after a cessation of the arcing of said bypass gap-device; said contact-controlling means being operative to reopen said contacts at some later time.

10. Protective means for a series-capacitor aggregate, comprising the combination, with said series-capacitor aggregate, of a bypass circuit around said series-capacitor aggregate; said bypass circuit including a bypass gap-device capable of carrying the maximum possible current for a time greater than a time which is adequate for clearing a fault on the circuit of which the series-capacitor aggregate is a part, and a bypass contactor having contacts in shunt to said bypass gap-device, said bypass gap-device having a low arcing voltage but having a breakdown voltage which is higher than the maximum permissible voltage which the series-capacitor aggregate can safely withstand for any material length of time; series-circuit overcurrent means responsive to a current slightly higher than normal, in the circuit of which the series-capacitor aggregate is a part, for causing said contactor contacts to close; means responsive to conditions corresponding to a still larger current, in the circuit of which the series-capacitor aggregate is a part, for causing arcing of said bypass gap-device before said maximum permissible voltage is substantially exceeded on the series-capacitor aggregate; and contact-controlling means responsive to the passage of a current in said bypass gap-device for normally causing said contactor contacts to close and to remain temporarily in closed position, even after a cessation of the arcing of said bypass gap-device; said contact-controlling means being operative to reopen said contacts at some later time.

11. A series-capacitor equipment for an alternating-current line, comprising the combination, with the series capacitor, of a main gap-device shunting said series capacitor, said main gap-device being of heavy current-capacity and having an insensitive breakdown-voltage characteristic which, at least at times, is higher than the voltage which can be permitted to appear on the series capacitor, an auxiliary gap-device, said auxiliary gap-device being of low current-capacity and having a sensitive breakdown-voltage characteristic, means for energizing said auxiliary gap-device in response to the voltage across the series capacitor whereby said auxiliary gap-device breaks down when the series-capacitor voltage rises to a value which is above normal but permissible, an auxiliary oscillatory circuit associated with said auxiliary gap-device, said auxiliary oscillatory circuit comprising a small inductance and a small capacitance connected in oscillatory circuit relation, means for so coupling said auxiliary oscillatory circuit to said main gap-device as to cause the latter to break down whenever the auxiliary gap-device breaks down, a bypass contactor having contacts in shunt to said main gap-device, and contact-controlling means responsive to the passage of a current in said main gap-device for causing said contactor contacts to close and to remain temporarily in closed position, even after a cessation of the arcing of said main gap-device, said contact-controlling means being operative to reopen said contacts at some later time.

12. A series-capacitor equipment for an alternating-current line, comprising the combination, with the series capacitor, of a main gap-device and a small serially connected inductance device in a shunt circuit around said series capacitor, said main gap-device being of heavy current-capacity and having an insensitive breakdown-voltage characteristic which, at least at times, is higher than the voltage which can be permitted to appear on the series capacitor, an auxiliary gap-device, said auxiliary gap-device being of low current-capacity and having a sensitive breakdown-voltage characteristic, stepup-transformer means for energizing said auxiliary gap-device in response to the voltage across the series capacitor whereby said auxiliary gap-device breaks down when the series-capacitor voltage rises to a value which is above normal but permissible, an auxiliary oscillatory circuit associated with said auxiliary gap-device, said auxiliary oscillatory circuit comprising a small inductance and a small capacitance connected in oscillatory circuit relation, means including at least some of said small serially connected inductance device and at least some of the small inductance of said auxiliary oscillatory circuit for so coupling said auxiliary oscillatory circuit to said main gap-device as to cause the latter to break down whenever the auxiliary gap-device breaks down, a bypass contactor having contacts in shunt to said main gap-device, and contact-controlling means responsive to the passage of a current in said main gap-device for causing said contactor contacts to close and to remain temporarily in closed position, even after a cessation of the arcing of said main gap-device, said contact-controlling means being operative to reopen said contacts at some later time.

13. A series-capacitor equipment for an alternating-current line, comprising, in combination, a series-capacitor aggregate, gap-device protective means therefor including a bypass gap-device which normally carries no substantial current but which breaks down and carries a substantial current in response to abnormal conditions in said series-capacitor aggregate and before said series-capacitor aggregate is impressed with a dangerously high current, whereby current is bypassed around said series-capacitor aggregate and excessive voltages are prevented therein, a bypass contact-make-and-break device shunted around said series-capacitor aggregate and around said gap-device protective means, said bypass contact-make-and-break device having means for normally biasing its contacts toward closed position, line-voltage-energized means for opening said contacts and for normally holding the same open in the normal use of the series-capacitor equipment, and contact-controlling means responsive to a substantial current-flow in the bypass gap-device for discontinuing the holding of the contacts in their open position, whereby said contacts close under the action of their biasing means, the construction and arrangement of the apparatus being such that said contacts thereupon remain temporarily closed, even after the cessation of a substantial current-flow in said bypass gap-device, said contact-controlling means being operative to permit the line-voltage-energized means to reopen said contacts at some later time.

14. A series-capacitor equipment for an alternating-current line, comprising, in combination, a series-capacitor aggregate, gap-device protective means therefor including a bypass gap-device which normally carries no substantial current but which breaks down and carries a substantial current in response to abnormal conditions in said series-capacitor aggregate and before said series-capacitor aggregate is impressed with a dangerously high current, whereby current is bypassed around said series-capacitor aggregate and excessive voltages are prevented therein, a bypass contact-make-and-break device shunted around said series-capacitor aggregate and around said gap-device protective means, said bypass contact-make-and-break device having means for normally biasing its contacts toward closed position, line-voltage-energized means for opening said contacts and for normally holding the same open in the normal use of the series-capacitor equipment, and means for closing said contacts when said bypass gap-device operates, for temporarily holding said contacts closed after said bypass gap-device is shunted by said contacts, and for subsequently reopening said contacts.

RALPH E. MARBURY.
WILLIAM H. CUTTINO.